Figure 1:
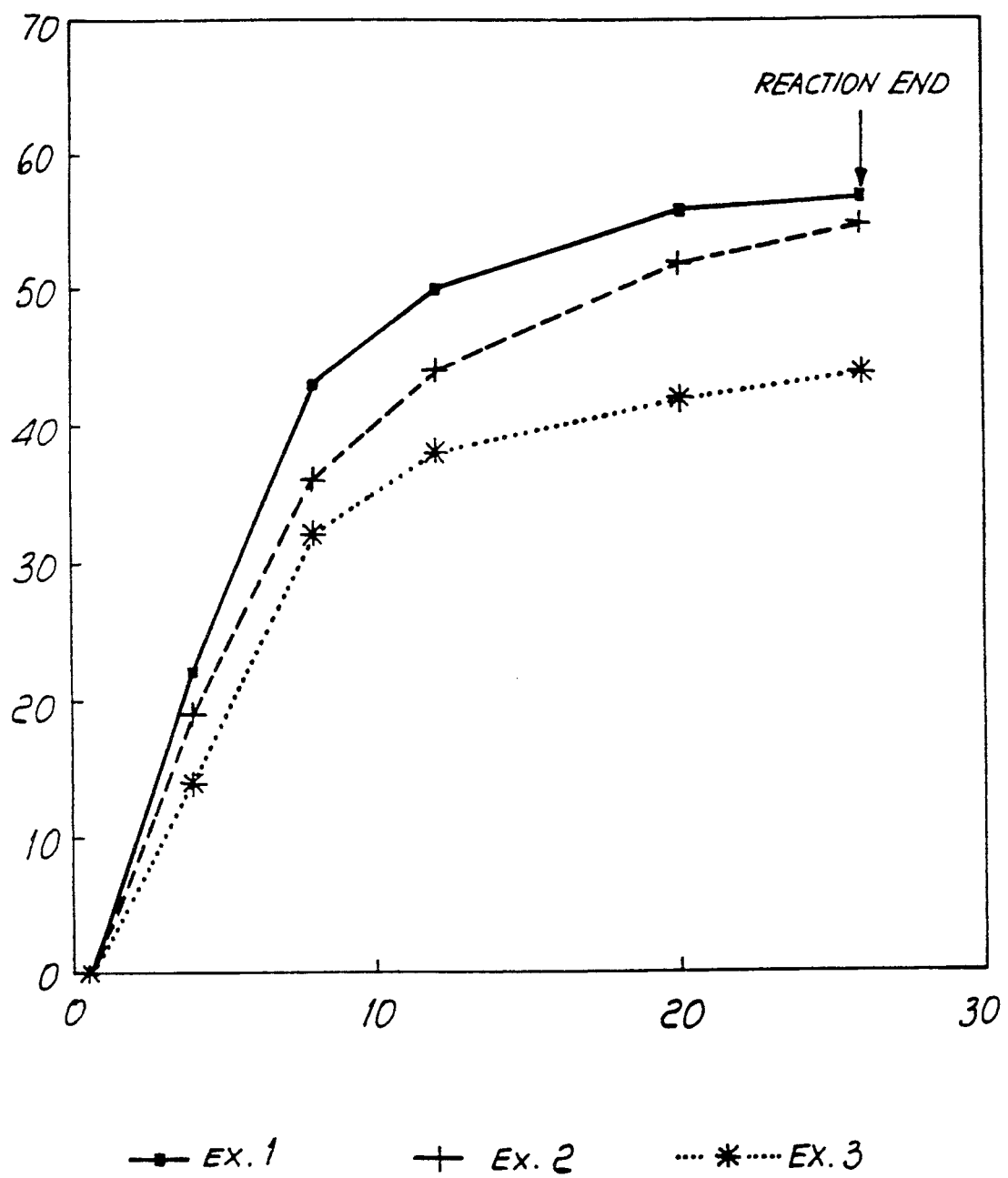

United States Patent [19]

Doré et al.

[11] Patent Number: 5,120,522
[45] Date of Patent: Jun. 9, 1992

[54] PROCESS FOR PREPARING BASIC ALUMINUM COMPOUNDS

[75] Inventors: Fausto Doré; Giordano Donelli, both of Brescia, Italy

[73] Assignee: Caffaro S.p.A., Italy

[21] Appl. No.: 549,017

[22] PCT Filed: Jan. 10, 1990

[86] PCT No.: PCT/EP90/00050

§ 371 Date: Sep. 18, 1990

§ 102(e) Date: Sep. 18, 1990

[87] PCT Pub. No.: WO90/08738

PCT Pub. Date: Aug. 9, 1990

[30] Foreign Application Priority Data

Jan. 25, 1989 [IT] Italy .............................. 19179 A/89

[51] Int. Cl.$^5$ .................... C01B 17/45; C01F 7/56
[52] U.S. Cl. .................... 423/462; 423/468; 423/556
[58] Field of Search ....... 423/467, 468, 462, DIG. 15, 423/556

[56] References Cited

U.S. PATENT DOCUMENTS

| 3,894,144 | 7/1975 | Becher et al. ............... 423/467 |
| 3,909,439 | 9/1975 | Rivola et al. ............... 423/462 |
| 3,920,406 | 11/1975 | Danner et al. .............. 423/462 |
| 3,920,800 | 11/1975 | Harris .................... 423/DIG. 15 |
| 3,957,947 | 5/1976 | Yamada et al. ............. 423/462 |
| 3,989,805 | 11/1976 | Notari et al. .............. 423/462 |
| 4,034,067 | 7/1977 | Seigneurin et al. .......... 423/467 |
| 4,082,685 | 4/1978 | Notari et al. .............. 423/462 |

FOREIGN PATENT DOCUMENTS 50-00839 1/1975 Japan .
457552 11/1936 United Kingdom ....... 423/DIG. 15

OTHER PUBLICATIONS

Chemical Abstract: 83:45400k—Aug. 11, 1975.

*Primary Examiner*—John Niebling
*Assistant Examiner*—Brian M. Bolam
*Attorney, Agent, or Firm*—Wolf, Greenfield & Sacks

[57] ABSTRACT

The present invention relates to a process for preparing basic aluminum compounds having the general formula (1)

$$[Al_2(OH)_x Cl_y (SO_4)_z]_n \qquad (1)$$

where:
n is at least equal to 1
x = 2–4.0
y = 2.0–3.40
z = 0–0.30
and
x + y + z = 6 by means of a reaction of alumina with hydrochloric acid, possibly mixed with sulfuric acid. The alumina is caused to react in alumina/acid(s) stoichiometric conditions to obtain the compounds of formula (1). The reaction is carried out by milling alumina in liquid phase under heavy stirring.

10 Claims, 8 Drawing Sheets

EX.1 = MICROSPHERE MILL.
EX.4 = BALL MILL.
EX.6 = STIRRED REACTOR

PROCESS FOR PREPARING BASIC ALUMINUM COMPOUNDS

TECHNICAL FIELD

The present invention relates to a process for preparing basic aluminum compounds. More particularly, the present invention relates to the preparation of basic aluminum compounds having the general formula (1)

$$[Al_2(OH)_x Cl_y (SO_4)_z]_n \quad (1)$$

where:
n is at least equal to 1
x = 2–4.0
Y = 2.0–3.40
z = 0 – 0.30 and
x + y + z = 6

The present invention furthermore relates to the use of an apparatus which is specified hereinafter in greater detail and by means of which it is possible to prepare the compounds of formula (1) at temperatures lower than 100° C. and at atmospheric pressure.

BACKGROUND ART

Basic compounds according to the invention are generally used in aqueous solution, but can also occur in the form of crystalline solids.

Said compounds are mainly used in the conditioning of water as flocculants and in the paper-sizing process. Bauxite, bayerite, gibbsite, hydrargillite etc. may be materials used as raw material, provided that they are hydrated oxides.

For the sake of simplicity, said compounds are hereinafter indicated by the generic term alumina.

Various methods, disclosed in patent and scientific literature, are known for obtaining basic compounds.

Ignoring electrochemical methods, the method most used industrially is the one which provides for the etching of alumina with a marked stoichiometric lack of hydrochloric acid. This etching must be performed at temperatures above 100° C. and under pressure. This process, operating under pressure and with a large excess of alumina which must be recycled, requires technologically demanding systems.

DISCLOSURE OF THE INVENTION

The Applicant has now surprisingly found, and this constitutes one of the aspects of the present invention, that it is possible to obtain basic aluminum compounds having the general formula (1) by making alumina react with hydrochloric acid, optionally mixed with sulfuric acid, at temperatures below 100° C., operating under given reaction conditions which are defined hereinafter.

One of the aspects of the present invention is therefore a process for preparing basic aluminum compounds having the general formula (1)

$$[Al_2(OH)_x Cl_y (SO_4)_z]_n \quad (1)$$

where
n is at least equal to 1
x = 2–4.0
y = 2.0–3.40
z = 0 – 0.30 and
x + y + z = 6 by means of the reaction of "alumina" with hydrochloric acid, possibly mixed with sulfuric acid, under atmospheric pressure said process being characterized in that (a) the alumina is caused to react with acid under stoichiometric conditions to obtain the compound of formula (I); and (b) the reaction according to item (a) is performed by milling the alumina in a liquid phase under heavy agitation at a temperature comprised between 50° C. and 95° C., in a microsphere mill, the operative parameters of said mill being the following:

(a) microsphere filling bodies with a diameter of 0.6-2.5 mm, (b) peripheral speed of stirring disks: 2.5 to 12 m/sec.

(c) degree of filling of the milling chamber with microspheres: 70% to 95% in apparent volume.

Preferably microspheres are formed of glass, ceramics, zirconia or similar materials.

The reaction temperature is preferably comprised between 75° C. and 95° C. and more preferably between 90° C. and 95° C.

Preferred operative parameters of said mill are the following:

(a) microsphere filling bodies made of zirconia and having a diameter of 0.8-1.2 mm, (b) peripheral speed of stirring disks: 10.5 m/sec;

(c) degree of filling of the milling chamber with microspheres: about 75% in apparent volume.

The apparatus employed, according to the invention, is preferably a thermostat-controlled tubular reactor filled with microspheres subjected to heavy shearing stresses. Said reactor is more preferably constituted by a cylindrical container made of glass or metal with a jacket (interspace) inside which liquid is circulated to keep the temperature at the required level. A stirring means, constituted by a shaft coated with PTFE (polyester) or PVDF (polyvinylidene fluoride). rotates at the center, and adequately shaped stirring disks, again made of PTFE or PVDF, are keyed thereon.

A further aspect of the present invention is the use of an apparatus as described above to prepare basic aluminum compounds having the general formula (1) in compliance with the process according to the present invention.

The aluminas employed may have different granulometries, with a maximum upper limit of 1 mm; an optimum granulometric value is comprised between 50 and 150 microns.

A typical specification of the alumina used in examples 1-12 described hereinafter is as follows:

| | |
|---|---|
| Loss at 105° C. | 0.1 ÷ 0.3% |
| Loss at 1200° C. | 35.5% |
| Al₂O₃ | approximately 65% |
| Total Na₂O | 0.2 ÷ 0.3% |
| Soluble Na₂O | 0.01 ÷ 0.03% |
| SiO₂ | 0.01 ÷ 0.02% |
| Fe₂O₃ | 0.01 ÷ 0.02% |
| CaO | approximately 0.01% |
| TiO₂ | approximately 0.002% |
| ZnO | approximately 0.001% |
| P₂O₅ | approximately 0.001% |
| Apparent density | 1200 g/l |
| Real density | 2.4 g/cu. cm. |
| Granulometry: | |
| >106 microns | 5 ÷ 20% |
| 63 ÷ 106 microns | 24 ÷ 45% |
| 45 ÷ 63 microns | 15 ÷ 35% |
| <45 microns | 20 ÷ 45% |

The above specification is in any case nonlimitative in terms of the present invention.

The hydrochloric acid used is constituted by an aqueous solution thereof with HCl concentrations comprised between 20% and 37% by weight. Said concentration is preferably comprised between 32% and 37%.

BRIEF DESCRIPTION OF EXAMPLES AND DRAWINGS

Figure 2:
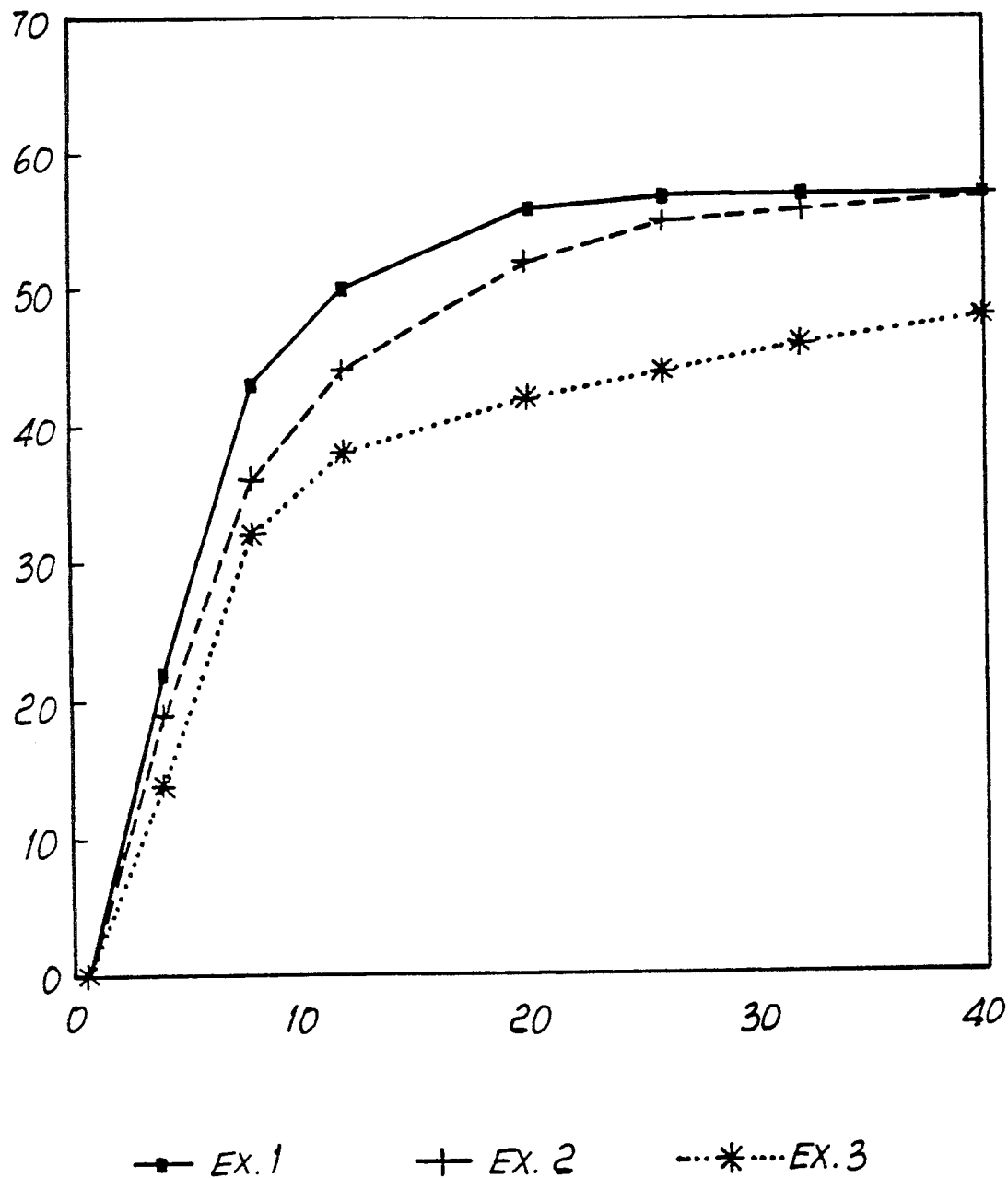
Figure 3:
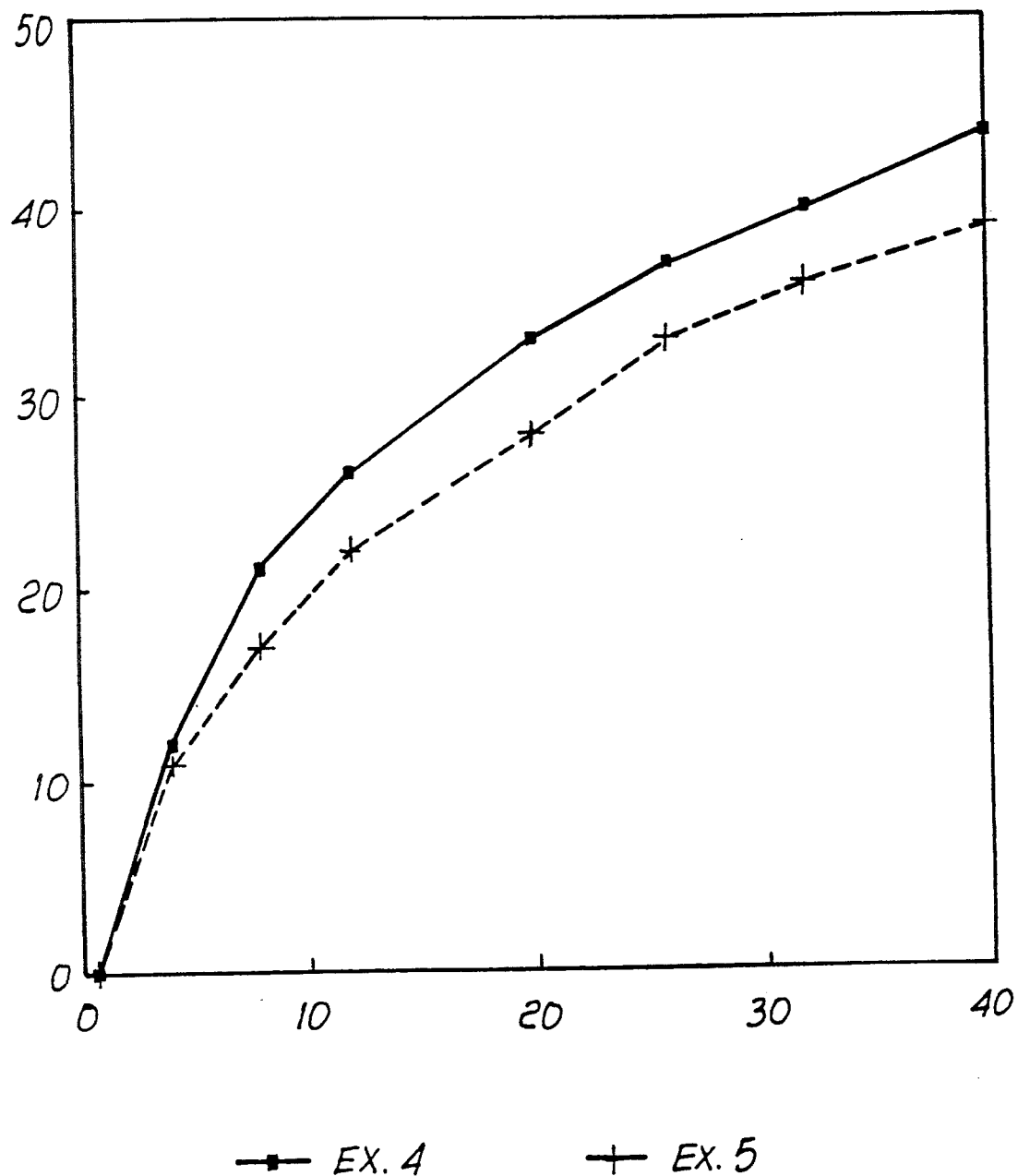
Figure 4:
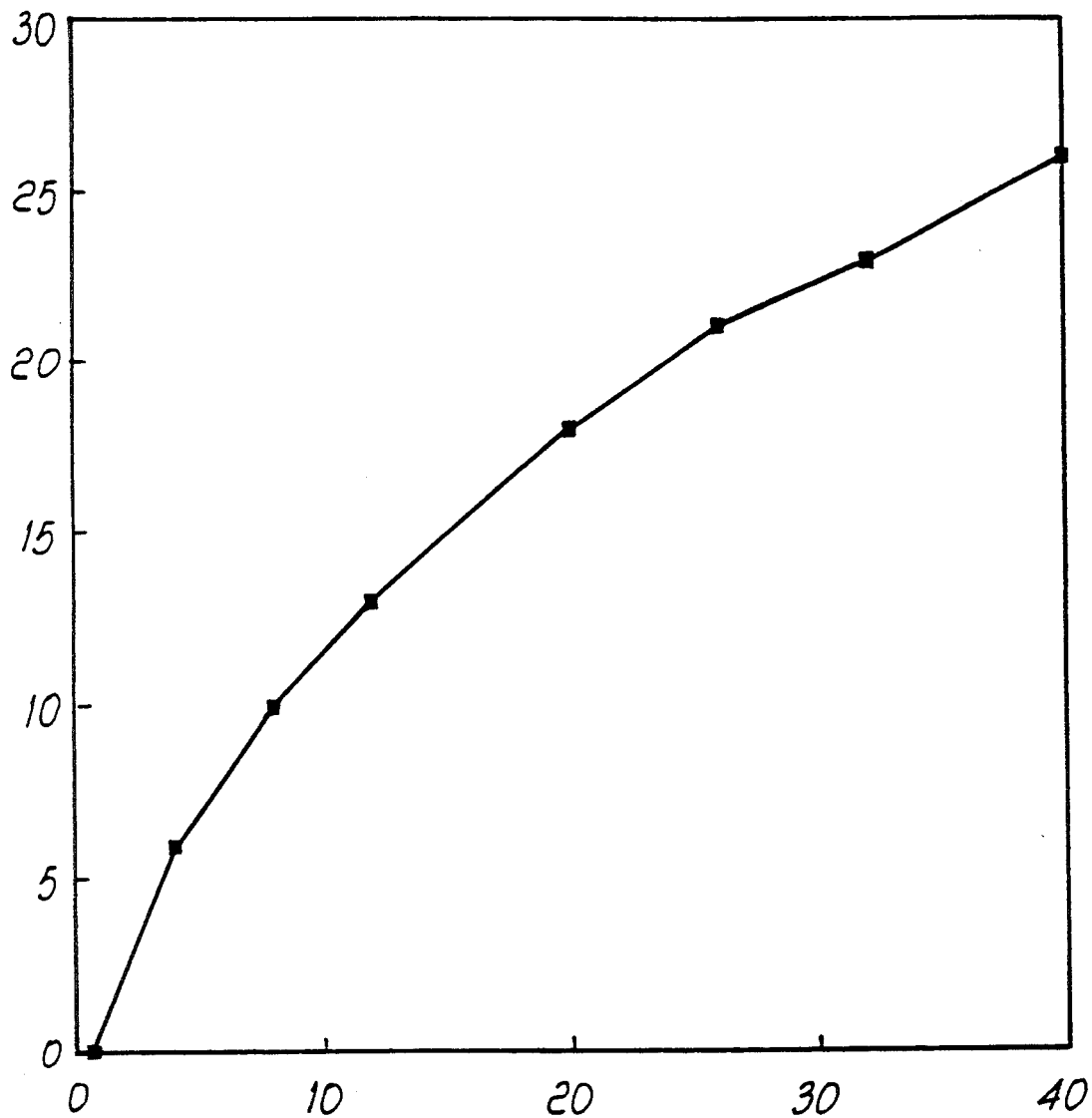
Figure 5:
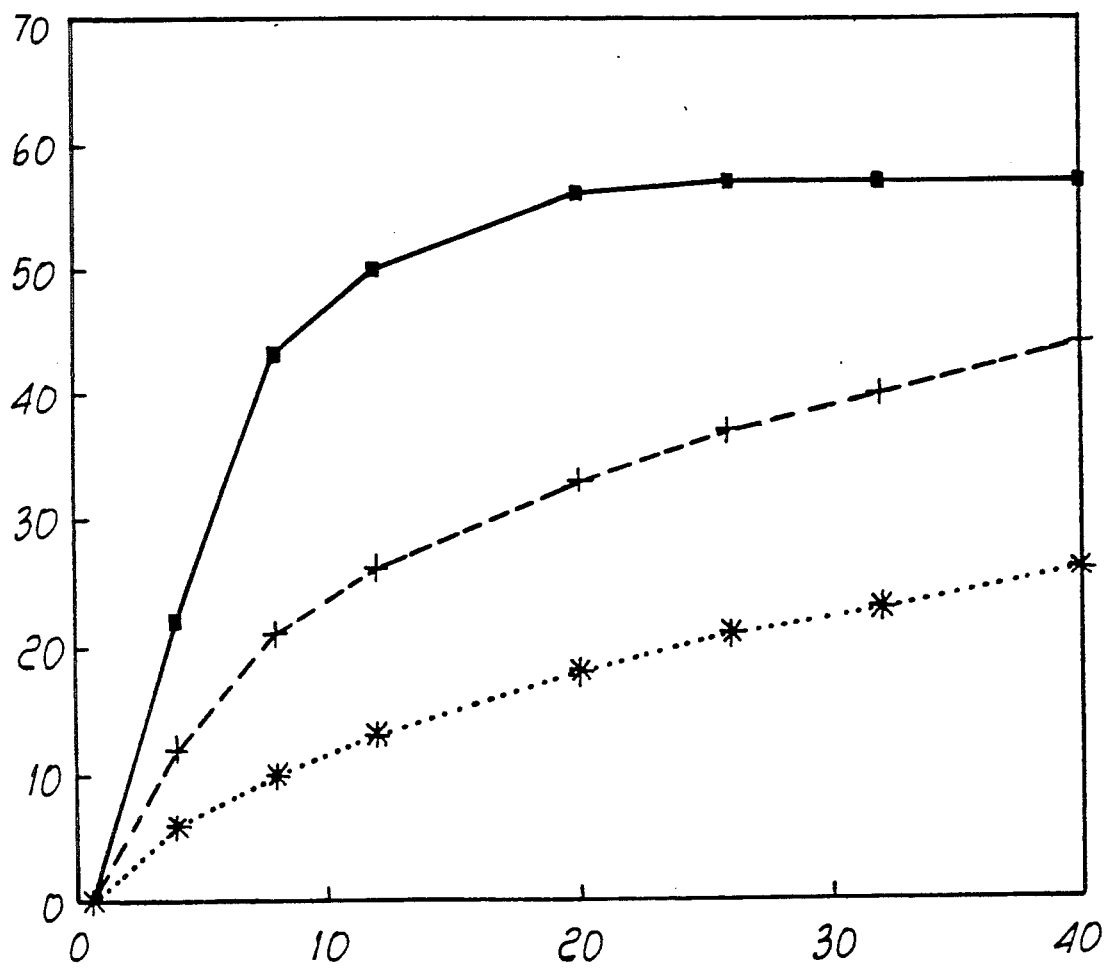

In order to better clarify the content of the invention and the advantages of the claimed process with respect to the processes known in the art, some examples of preparation are provided hereafter; examples 1, 2, 3, 7, 8, 9 disclose the invention and have no restrictive nature; examples 4, 5, 10 and 11 are comparison examples where a conventional ball mill is used; examples 6 and 12 are comparison examples in which a reactor conventional for this type of reactions is used. The Examples are also clarified by the drawings in which FIG. 1-8 are diagrams which report on ordinate the basicity % and on abscissae the time in hours. In particular:

FIG. 1 and 2 disclose the kinetics of the reaction $Al(OH)_3 + HCl$ in a microsphere mill;

FIG. 3 discloses the kinetics of the reaction $Al(OH)_3 + HCl$ in a ball mill, in a comparison example;

FIG. 4 discloses the kinetics of the reaction $Al(OH)_3 + HCl$ in a stirred reactor, in a comparison example;

FIG. 5 discloses the kinetics of the reaction $Al(OH)_3 + HCl$ in different vessels at a temperature of 95

Figure 6:
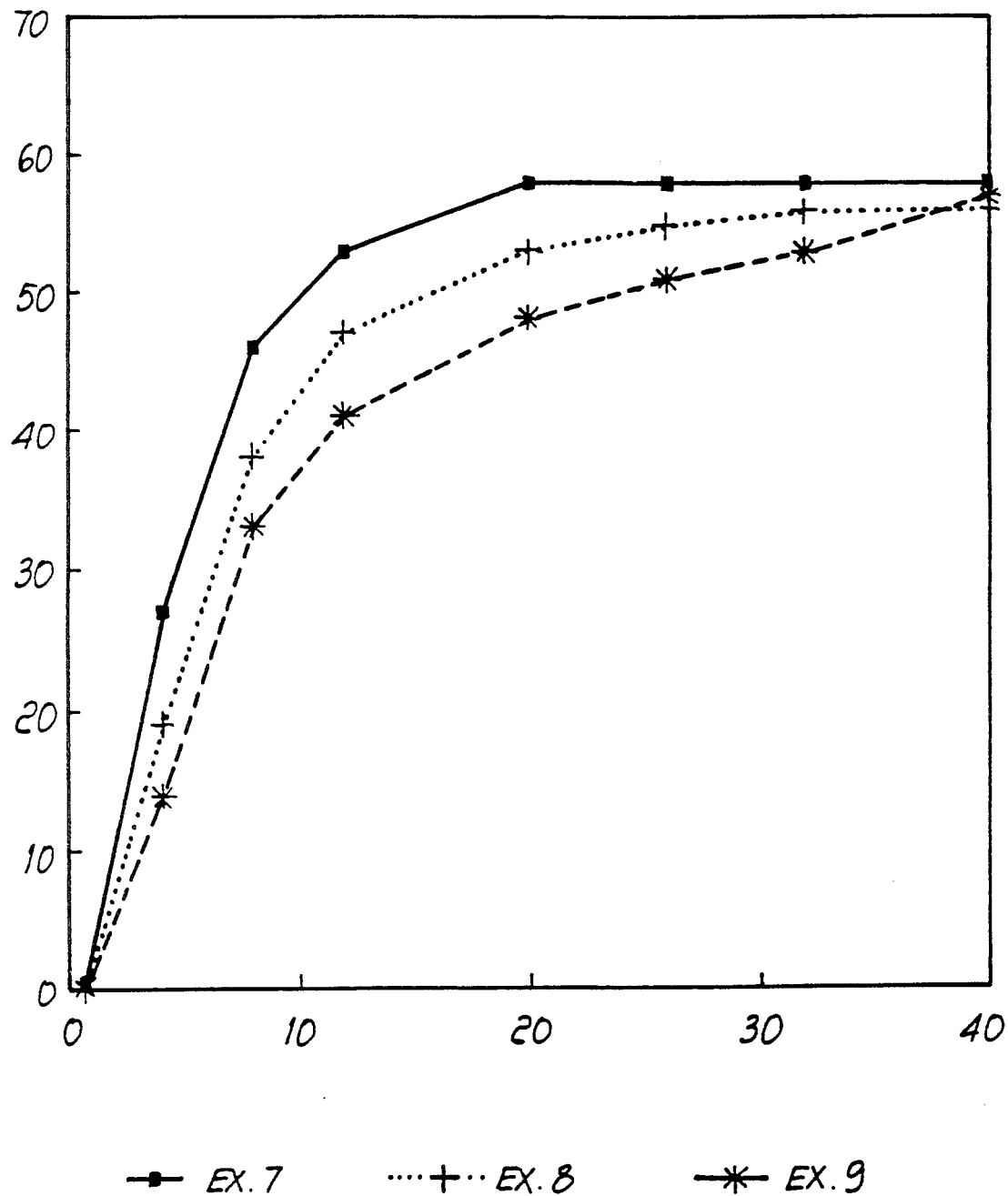
Figure 7:
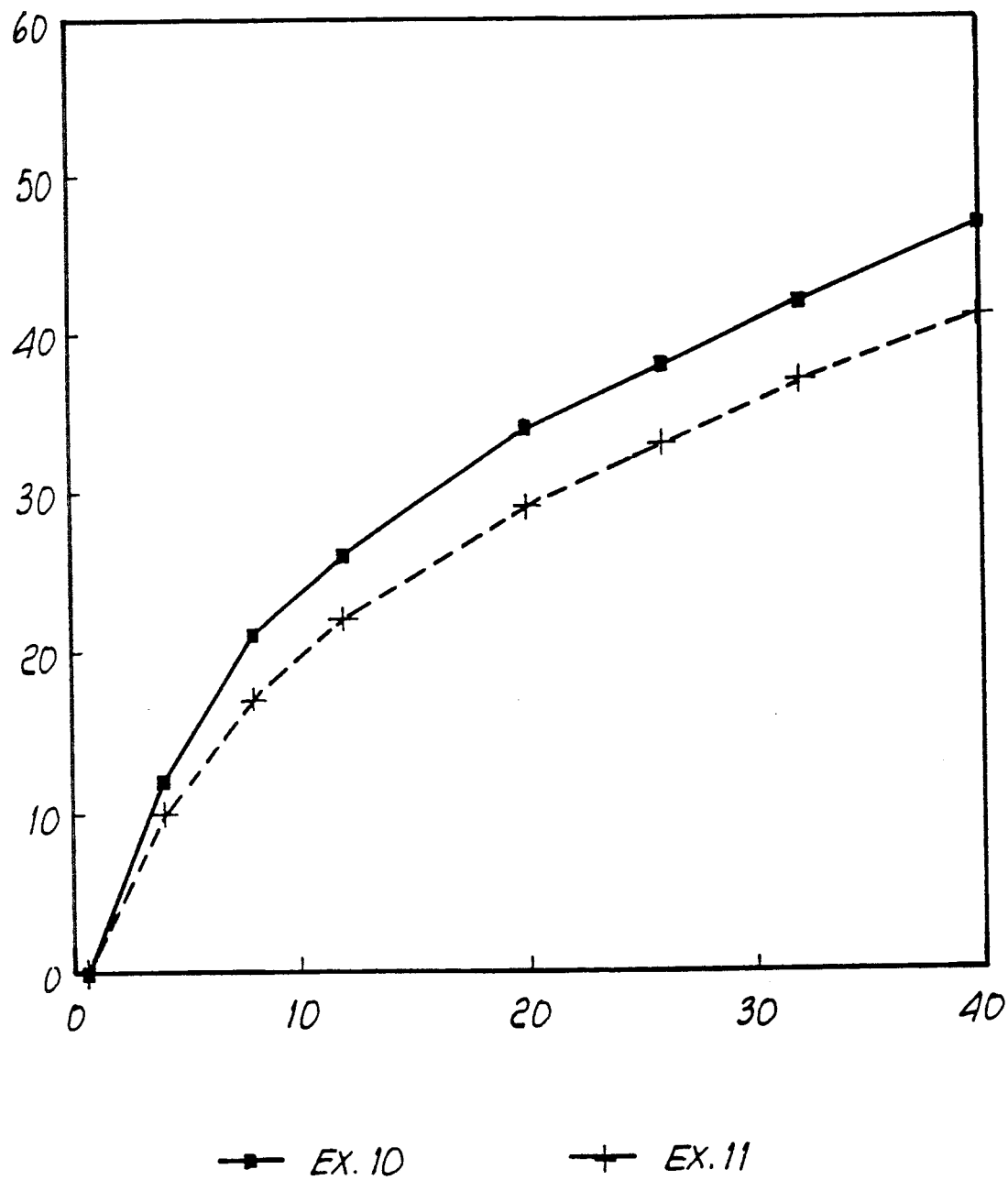
Figure 8:
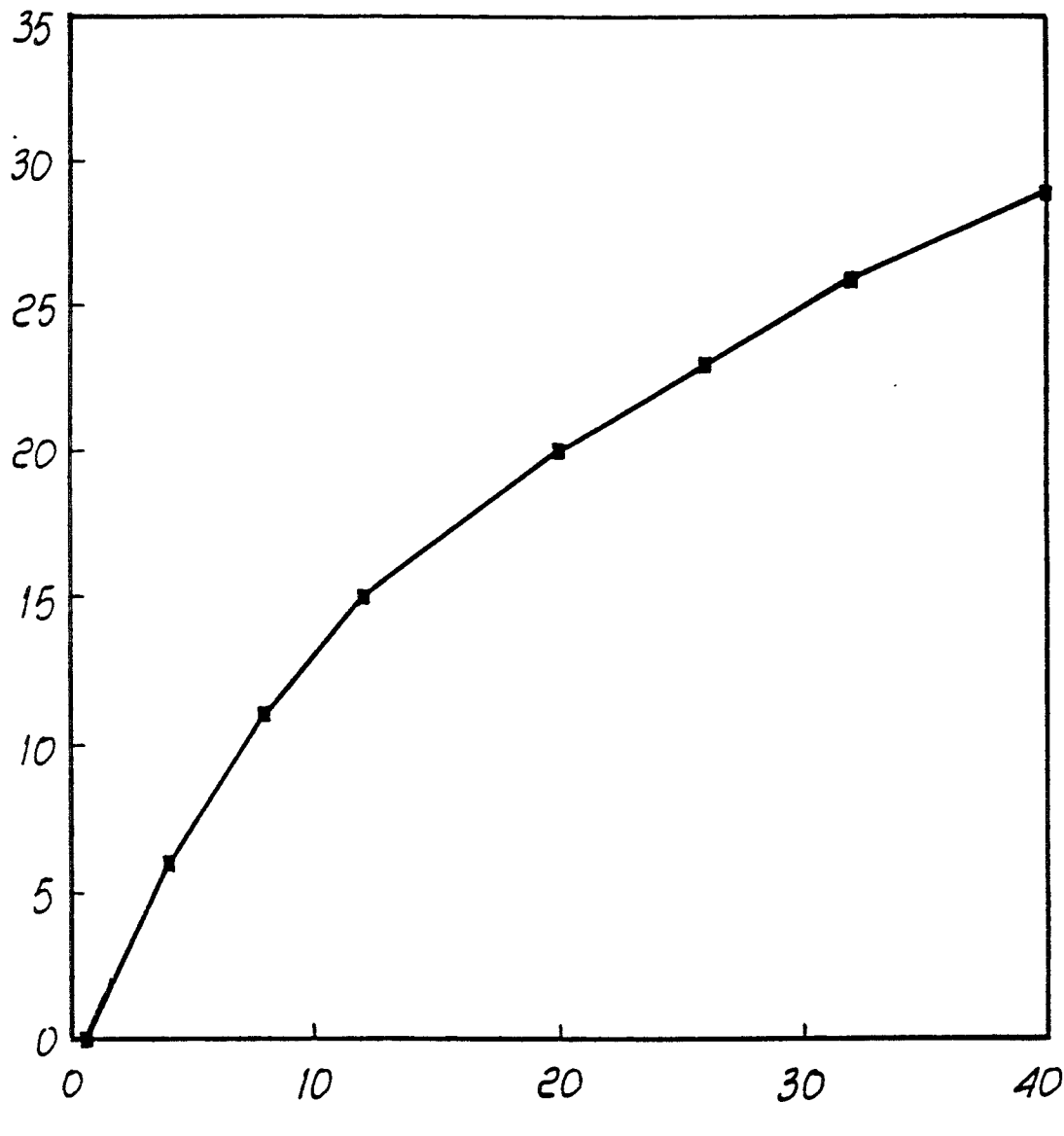

FIG. 6 discloses the kinetics of the reaction $Al(OH)_3 + HCl + H_2SO_4$ in a microsphere mill;

FIG. 7 discloses the kinetics of the reaction $Al(OH)_3 + HCl + H_2SO_4$ in a ball mill in a comparison example;

FIG. 8 discloses the kinetics of the reaction $Al(OH)_3 + HCl + H_2SO_4$ in a stirred reactor in a comparison example.

WAYS OF CARRYING OUT THE INVENTION

Example 1

1.5 liters of zirconia spheres with a diameter of 0.8-1.2 mm are loaded into a 2-liter vertical reactor constituted by a glass jacketed cylindrical chamber and by a PTFE internal stirrer equipped with 3 disks which rotate with a peripheral speed of 10.5 m/s.

487.6 g of 33% hydrochloric acid are then loaded and 270.9 g of alumina according to the previously indicated specifications are loaded under stirring.

The reaction temperature is kept at 90°-95° C. by circulating thermostatic fluid in the jacket.

Samples are periodically extracted, and their analysis reveals the behavior of the reaction kinetics, which is hereafter shown in the graph of FIGS. 1, 2, 5.

After 26 hours of reaction, the turbid solution is diluted with 235.4 g of water and filtered to remove the unreacted alumina.

Analysis of the final product shows an $Al_2O_3$ content of 17.7% and a Cl content of 15.6%, corresponding to a basicity of 57% and to the general formula $(Al_2(OH)_{3.5}Cl_{2.5})_n$.

The alumina yield is 98.6%

Example 2

A reaction is performed in the same apparatus, in the same conditions and with the same amount and concentration of reagents as in Example 1, keeping the temperature at 75°-80° C.

Samples are periodically extracted, and their analysis reveals the behavior of the reaction kinetics, which is hereafter shown in the graph of FIGS. 1 and 2.

After 40 hours of reaction, the turbid solution is diluted and filtered as in Example 1.

Analysis of the final product shows an $Al_2O_3$ content of 17.9% and a Cl content of 15.8%, corresponding to a basicity of 57% and to the general formula $(Al_2(OH)_{3.5}Cl_{2.5})_n$.

The alumina yield is 98.5%.

Example 3

A reaction is performed in the same apparatus, in the same conditions and with the same amount and concentration of reagents as in Example 1, keeping the temperature at 60°-65° C.

Samples are periodically extracted, and their analysis reveals the behavior of the reaction kinetics, which is hereafter shown in the graph of FIGS. 1 and 2.

After 40 hours of reaction, the turbid solution is diluted and filtered as in Example 1.

Analysis of the final product shows an $Al_2O_3$ content of 16.2% and a Cl content of 16.2%, corresponding to a basicity of 52% and to the general formula $(Al_2(OH)_{3.1}Cl_{2.9})_n$.

The alumina yield is 86.8%.

Example 4 (comparison with Example 1)

A test was performed in a conventional ball mill constituted by a ceramic chamber which rotates on rollers and is completely immersed in a thermostatic bath. The volume of the chamber is 2 l; said chamber is filled with 1 liter of ceramic spheres with a diameter of 20-15-10-5 mm, equally distributed by weight; the internal diameter is 150 mm and the rotation speed is 60 rpm.

A thermocouple with sliding contacts passes through the closure and detects the internal temperature.

The same amount and concentration of reagents as in Example 1 is loaded, the container is closed, the thermocouple is connected and rotation is started, adjusting the temperature of the thermostatic bath so as to keep the internal temperature at 90°-95° C. during the entire test.

Samples are periodically extracted by passing through the same opening as the thermocouple, and their analysis reveals the behavior of the reaction kinetics, which is hereafter shown in the graph of FIGS. 3 and 5. After 26 hours, basicity was found to be only 37%. After 40 hours of reaction, the suspension is diluted and filtered as in Example 1.

Analysis of the final product shows an $Al_2O_3$ content of 14.4% and a Cl content of 16.8%, corresponding to a basicity of 44% and to the general formula $(Al_2(OH)_{2.64}Cl_{3.36})_n$.

The alumina yield is 74.4%.

Example 5 (comparison with Example 2)

A reaction is performed with the same amount and concentration of reagents indicated in Example 2, but the apparatus described in Example 4 is used and the temperature is kept at 75°-80° C.

As in Example 4, samples are periodically extracted and their analysis reveals the behavior of the reaction kinetics, which is hereafter shown in a graph in FIG. 3.

After 40 hours of reaction, the suspension is diluted and filtered as in Examples 4 and 1.

Analysis of the final product shows an $Al_2O_3$ content of 13.5% and a Cl content of 17.1%, corresponding to a basicity of 39% and to the general formula $(Al_2(OH)_{2.34}Cl_{3.66})_n$.

The alumina yield is 68.3%.

Example 6 (comparison with Example 1)

A test was performed in a 1-liter conventional jacketed reactor equipped with a stirrer and with no milling action. The stirrer had a diameter of 50 mm and rotated at the rate of 100 rpm, with a consequent peripheral speed of 0.27 m/s.

The same amount and concentration of reagents as in Example 1 is loaded, keeping the temperature at 90°-95° C. by circulating thermostatic liquid in the jacket.

Analysis of the samples extracted during the reaction reveals the kinetics, which is hereafter illustrated in a graph in FIGS. 4 and 5.

After 26 hours, basicity had reached only 21%.

After 40 hours of reaction, the suspension is diluted and filtered as in Example 1.

Analysis of the final product shows an $Al_2O_3$ content of 11.2% and a Cl content of 17.9%, corresponding to a basicity of 26% and to the general formula $(Al_2(OH)_{1.4}Cl_{4.6})_n$.

The alumina yield is 54.3%.

Example 7

35 g of water, 426.6 g of 33% hydrochloric acid and 27.08 g of 96% sulfuric acid are loaded into the same apparatus and in the same conditions as Example 1; 276.9 g of alumina according to the previously indicated specifications are subsequently loaded under stirring. The temperature is kept at 90°-95° C. by means of the thermostatic liquid which circulates in the jacket.

Samples are periodically extracted, and their analysis reveals the behavior of the reaction kinetics, which is hereafter illustrated in a graph in FIG. 6.

After 20 hours of reaction, the turbid solution is diluted with 236.4 g of water and filtered as in Example 1.

Analysis of the final product shows an $Al_2O_3$ content of 17.8%, a Cl content of 13.7% and an $SO_4$ content of 2.6%, corresponding to a basicity of 58% and to the general formula $(Al_2(OH)_{3.5}Cl_{2.2}(SO_4)_{0.15})_n$.

The alumina yield is 98.6%.

Example 8

A reaction is performed in the same apparatus and in the same conditions as Example 1 and with the same amount and concentration of reagents indicated in Example 7, but the temperature is kept at 75°-80° C.

Analysis of samples periodically extracted reveals the behavior of the reaction kinetics which is illustrated hereafter in a graph in FIG. 6.

After 32 hours of reaction, the turbid solution is diluted and filtered as in Examples 1 and 7.

Analysis of the final product shows an $Al_2O_3$ content of 17.3%, a Cl content of 13.9% and an $SO_4$ content of 2.6%, corresponding to a basicity of 56% and to the general formula $(Al_2(OH)_{3.4}Cl_{2.3}(SO_4)_{0.15})_n$.

The alumina yield is 94%.

Example 9

A reaction is performed in the same apparatus and in the same conditions as Example 1 and with the same amount and concentration of reagents indicated in Example 7, but the temperature is kept at 60°-65° C.

Analysis of samples periodically extracted reveals the behavior of the reaction kinetics which is illustrated hereafter in a graph in FIG. 6.

After 40 hours of reaction, the turbid solution is diluted and filtered as in Examples 1 and 7.

Analysis of the final product shows an $Al_2O_3$ content of 17.5%, a Cl content of 13.6% and an $SO_4$ content of 2.6%, corresponding to a basicity of 57% and to the general formula $(Al_2(OH)_{3.4}Cl_{2.3}(SO_4)_{0.15})_n$.

The alumina yield is 96.5%.

Example 10 (comparison with Example 7)

A reaction is performed with the same quantity and concentration of reagents as indicated in Example 1 using the same apparatus and in the same conditions described in Example 4 and keeping the temperature at 90°-95° C.

Samples are periodically extracted and their analysis reveals the behavior of the reaction kinetics, which is illustrated hereafter in a graph in FIG. 7.

After 40 hours of reaction, the suspension is diluted and filtered as in Example 1 and others.

Analysis of the final product shows an $Al_2O_3$ content of 15%, a Cl content of 14.5% and an $SO_4$ content of 2.7%, corresponding to a basicity of 47% and to the general formula $(Al_2(OH)_{2.8}Cl_{2.8}(SO_4)_{0.2})_n$.

The alumina yield is 78%.

Example 11 (comparison with Example 8)

A reaction is performed with the same amount and concentration of reagents indicated in Example 7, but using the same apparatus and the same conditions as in Example 4, and the temperature is kept at 75°-80° C. (as in Example 8).

Analysis of samples periodically extracted reveals a behavior of the reaction kinetics which is illustrated hereafter in a graph in FIG. 7.

After 40 hours of reaction, the suspension is diluted and filtered as in Example 1 and others.

Analysis of the final product shows an $Al_2O_3$ content of 10.0%, a Cl content of 14.95 and an $SO_4$ content of 2.75%, corresponding to a basicity of 41% and to the general formula $(Al_2(OH)_{2.5}Cl_{3.1}(SO_4)_{0.2})_n$.

The alumina yield is 70%.

Example 12 (comparison with Example 7)

A reaction is performed with the same amount and concentration of reagents indicated in Example 7, using the same devices and the same conditions as in Example 6, and the temperature is kept at 90°-95° C.

Samples are periodically extracted, and their analysis reveals the reaction kinetics illustrated hereafter in a graph in FIG. 8.

After 40 hours of reaction, the suspension is diluted and filtered as in Example 1 and others.

Analysis of the final product shows an $Al_2O_3$ content of 12.1%, a Cl content of 15.4% and an $SO_4$ content of 2.85%, corresponding to a basicity of 31% and to the general formula $(Al_2(OH)_{1.85}Cl_{3.65}(SO_4)_{0.25})_n$.

The alumina yield is 60%.

We claim:

1. A process for preparing basic aluminum compounds having a general formula $$[Al_2(OH)_xCl_y(SO_4)_z]_n$$

where
n is at least equal to 1
x=2-4.0
y=2.0-3.40
z=0—0.30 and $x+y+z=6$ by means of the reaction of alumina with hydrochloric acid, optionally mixed with sulfuric acid, at atmospheric pressure, said process being characterized in that (a) the alumina is caused to react with said acid under stoichiometric conditions at atmospheric pressure to obtain the compound of the general formula; and wherein (b) step (a) is performed by milling the alumina in a liquid phase with stirring at a temperature between about 50° C. and about 95° C. in a mill containing microspheres, operative parameters of said mill being the following:

(i) said microspheres having a diameter of about 0.6 to about 2.5 mm;

(ii) said stirring at a peripheral speed of about 2.5 to about 12 meters per second;

(iii) said microspheres filling said mill to an apparent volume of between about 75 percent to about 95 percent.

2. The process according to claim 1, wherein the reaction is performed at a temperature between about 75° and about 95° C.

3. The process according to claim 2, wherein the reaction is performed at a temperature between about 90° C. and about 95° C.

4. The process according to claim 1, wherein the milling of the alumina is performed in a thermostat-controlled tubular reactor, the alumina being subjected to shearing stresses.

5. The process according to claim 4, wherein said tubular reactor is made of glass or metal with a jacket in which liquid is circulated to keep temperatures within required values, said reactor being provided with a rotary stirrer having a shaft coated with polyester or polyvinylidene fluoride, upon which shaft stirrer disks made of the same material are keyed.

6. The process according to claim 5, wherein operative parameters of the milling of the alumina are as follows:

a) said microspheres having a diameter between about 0.8 and about 1.2 mm, said microspheres made of zirconia;

b) said stirring disks having a peripheral speed of about 10.5 meters per second; and c) said microspheres filling said chamber to an apparent volume of about 75 percent.

7. A process for preparing a basic aluminum compound having a general formula:

$$[Al_2(OH)_x(Cl)_y(SO_4)_z]_n:$$

where n is at least 1,
$x = 2-4$,
$y = 2-3.4$,
$z = 0-0.3$ and
$x+y+z=6$;

comprising the steps of (a) forming a reaction mixture of at least on hydrated aluminum oxide with hydrochloric acid and, optionally, with sulfuric acid;

(b) reacting the mixture at a temperature of less than about 100° C. and at atmospheric pressure in a milling chamber containing microspheres;

(c) providing to said chamber a means for stirring said reaction mixture;

(d) stirring the reaction mixture at a stirring speed of between about 2.5 and about 12 meters per second, the speed sufficient to induce shear stress in the hydrated aluminum oxide;

(e) allowing said stirring to continue for a time sufficient to produce a solid suspension having a basicity of at least about 50%.

(f) adding diluent to the suspension;

(g) separating solid material from the diluent, the solid material comprising a compound of the general formula.

8. The method of claim 7, wherein if the reaction mixture lacks sulfuric acid and the temperature is between about 75° C. and about 95° C., then a basic aluminum compound is produced in which x is 3.5 and y is 2.5, and wherein if the reaction mixture lacks sulfuric acid and the temperature is between about 60 and about 65° C., then a basic aluminum compound is produced in which x is 3.1 and y is 2.9.

9. The method of claim 7, wherein if both sulfuric acid and hydrochloric acid are present in the reaction mixture, and the temperature is about 90° to about 95° C., then a basic aluminum compound is produced in which x is 3.5, y is 2.2 and z is 0.15; and wherein if the temperature is between about 60° and about 75° C., then a basic aluminum compound is produced in which x is 3.4, y is 2.3 and z is 0.15.

10. The method of claim 7, wherein the hydrated aluminum oxide is selected from the group consisting of boehmite, diaspore, gibbsite and bayerite.

* * * * *